(12) United States Patent
Glass

(10) Patent No.: US 7,975,806 B2
(45) Date of Patent: Jul. 12, 2011

(54) LUBRICATION SYSTEM FOR A PART IN AN INTERNAL COMBUSTION SYSTEM

(75) Inventor: Douglas Lloyd Glass, Travelers Rest, SC (US)

(73) Assignee: Liquid Combustion Technology, LLC, Travelers Rest, SC (US)

( * ) Notice: Subject to any disclaimer, the term of this patent is extended or adjusted under 35 U.S.C. 154(b) by 291 days.

(21) Appl. No.: 11/878,133

(22) Filed: Jul. 20, 2007

(65) Prior Publication Data

US 2008/0017450 A1    Jan. 24, 2008

(51) Int. Cl.
*F01M 1/06* (2006.01)

(52) U.S. Cl. ...... 184/6.5; 184/6.16; 184/11.1; 184/11.4; 184/13.1; 74/579 R; 123/197.1; 123/197.2; 123/197.3; 123/197.4; 384/288; 384/294

(58) Field of Classification Search ............. 184/6.5, 184/11.1, 6.16; 123/197.1–197.4; 74/579 R; 384/288, 294

See application file for complete search history.

(56) References Cited

U.S. PATENT DOCUMENTS

| | | |
|---|---|---|
| 1,179,194 A | 4/1916 | Lane |
| 1,744,775 A | 1/1930 | Lindsay |
| 1,772,461 A | 8/1930 | Jahnke |
| 1,786,934 A | 12/1930 | Briggs |
| 1,800,077 A | 4/1931 | Jennings |
| 1,933,912 A | 11/1933 | Kalb |
| 1,936,101 A * | 11/1933 | Baits et al. ............ 184/13.1 |
| 1,978,714 A | 10/1934 | Lentell, Jr. |
| 1,990,558 A | 2/1935 | Meyer |
| 2,232,170 A | 2/1941 | Eynon |
| 2,473,096 A | 6/1949 | Wilson et al. |
| 2,661,253 A * | 12/1953 | Barlow et al. ............ 384/155 |
| 2,728,331 A | 12/1955 | Louzecky et al. |
| 3,017,229 A | 1/1962 | Dilworth |
| 3,314,305 A * | 4/1967 | Friedrich ............ 74/579 R |
| 3,361,007 A | 1/1968 | Belsanti et al. |
| 3,687,231 A | 8/1972 | Scheiterlein |
| 3,739,657 A | 6/1973 | Patchen et al. |
| 3,751,080 A | 8/1973 | Bailey et al. |
| 3,785,459 A | 1/1974 | Patchen |
| 3,818,577 A | 6/1974 | Bailey et al. |

(Continued)

FOREIGN PATENT DOCUMENTS

DE    3141730 C1    4/1983

(Continued)

OTHER PUBLICATIONS

International Search Report and Written Opinion of PCT/US07/16306 dated Sep. 12, 2008.

*Primary Examiner* — Robert A Siconolfi
*Assistant Examiner* — San Aung
(74) *Attorney, Agent, or Firm* — Finnegan Henderson Farabow Garrett & Dunner, L.L.P.

(57) ABSTRACT

A lubrication system comprising a bore including an inlet for receiving lubrication, an outlet for distributing lubrication, and a inner passageway extending between the inlet and outlet is provided. The outlet may be provided with a wider opening than the passageway. The outlet may further include a groove having a radius of curvature, and defined by a pair of flat or curved sidewalls, and a pair of curved end walls each extending toward the inner passageway.

14 Claims, 5 Drawing Sheets

U.S. PATENT DOCUMENTS

| | | | |
|---|---|---|---|
| 4,422,348 A | 12/1983 | Campbell | |
| 4,449,491 A | 5/1984 | Tsuchiyama et al. | |
| 4,693,139 A | 9/1987 | Mukai et al. | |
| 4,802,269 A | 2/1989 | Mukai et al. | |
| 4,896,634 A | 1/1990 | Kronich | |
| 5,243,878 A * | 9/1993 | Santi | 74/579 R |
| 5,265,700 A * | 11/1993 | Santi | 184/6.5 |
| 6,604,859 B1 * | 8/2003 | Bonazoli | 384/397 |
| 6,907,848 B2 | 6/2005 | Beardmore | |
| 2002/0020400 A1 | 2/2002 | Sato et al. | |
| 2005/0076740 A1 * | 4/2005 | Ford et al. | 74/587 |

FOREIGN PATENT DOCUMENTS

| | | |
|---|---|---|
| FR | 2562156 A1 | 10/1985 |
| JP | 63260730 A | 10/1988 |
| JP | 01135920 A | 5/1989 |
| JP | 03242433 A | 10/1991 |
| JP | 06147218 A | 5/1994 |

* cited by examiner

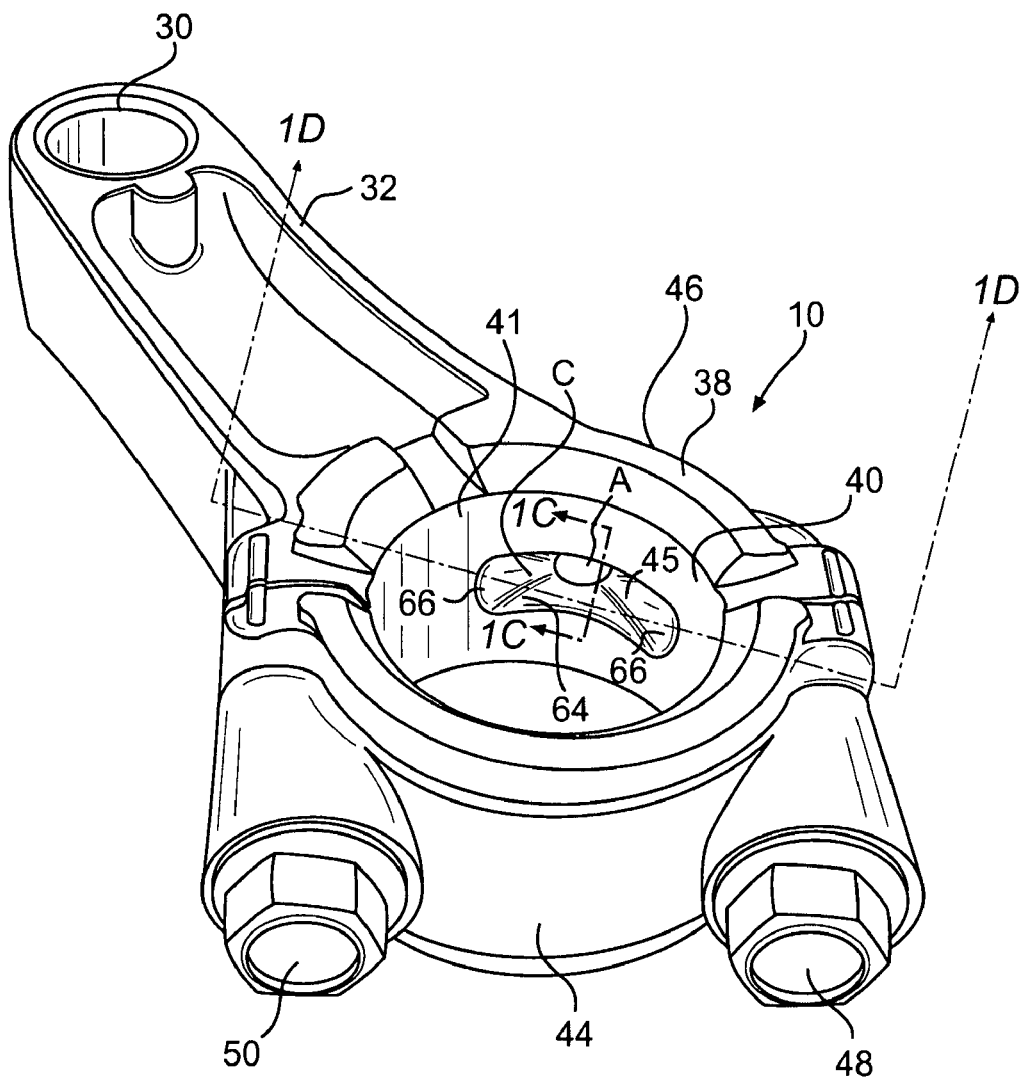
FIG. 1A
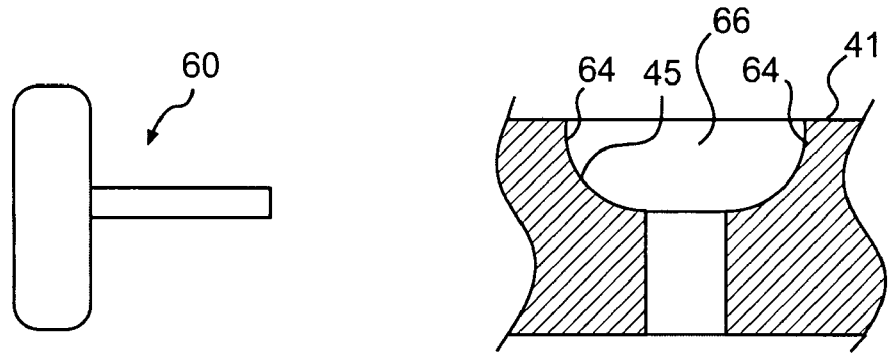
FIG. 1B  FIG. 1C

US 7,975,806 B2

LUBRICATION SYSTEM FOR A PART IN AN INTERNAL COMBUSTION SYSTEM

FIELD OF THE INVENTION

The present invention relates to a lubrication system for a part of an internal combustion engine, and more particularly to an improved lubrication bore for a connecting rod in such an internal combustion engine.

BACKGROUND OF THE INVENTION

In an internal combustion engine, connecting rods are often provided to connect a reciprocating piston to a rotating crankshaft. The connecting rod assembly is often sturdy and designed to bear the load of combustion while undergoing reciprocating and rotary motions. The assembly layout may comprise three basic parts: a first end connected to the piston, a second end connected to the crankshaft, and a beam that connects the first end to the second end. Typically, the first end is smaller than the second end. The first end may contain a cylindrical hole, which receives a steel pin ("wrist" pin). The wrist pin may be mounted, for example, on opposed sides of a piston skirt. The wrist pin may allow the rod to transfer the reciprocating motion of the piston to the rotary motion of the crankshaft.

The second end of the connecting rod assembly may have a larger cylindrical opening that conforms to the shape of the journal of a crankshaft pin ("crank pin"). The larger opening may be formed by two separate pieces for enclosing the crank pin. The larger of the two pieces may consist of a small end, an intermediate beam and a portion of the large cylindrical opening for the crank pin. The smaller of the two pieces may comprise an end piece or bearing cap, which provides the remainder of the large cylindrical opening. The larger piece may be designed to fit around one side of the crank pin. The bearing cap may be designed to fit around the other side to enclose the crank pin. Retaining means such as bolts may be utilized to connect the bearing cap to the larger portion of the connecting rod assembly to complete the connection of the piston to the crankshaft. Bearing inserts may be used when mounting the assembly on the crank pin to allow the rod to move freely.

Hence, connecting rods may typically have two-piece crankpin bearings for connecting the lower end of the rod to a crankpin of a crankshaft. The two-piece assembly may comprise an arcuate-shaped bearing portion integrally formed on the lower end of the rod, and a cap member, which is assembled to the bearing portion by means of a pair of cap screws.

Lubrication may be provided between the relatively moving crankpin and crankpin bearing parts, through bores extending radially through the crankpin bearing. The bores may have an inlet located at the exterior surface of the crankpin bearing and an outlet communicating with the crankpin bearing hole. The bores provide oil to the interior of the crankpin bearing during operation, and, in particular, during startup of an engine, can quickly supply oil to the interior of the bearing.

In some previous designs, a connecting rod may include designs for conveying lubrication into a crankpin bearing. However, such connecting rod designs may not provide sufficient lubrication to bearing surfaces since, for example, the design may not allow lubricant to flow sufficiently in order to reduce friction as the connecting rod rotates.

Accordingly, it is desirable to provide an apparatus that may provide improved and/or constant lubrication to bearing surfaces. It is also desirable to provide an apparatus that extends the life of bearing surfaces by supplying and retaining lubricant upon the surfaces thereon and minimizing frictional contact between bearing surfaces.

SUMMARY OF THE INVENTION

The foregoing needs are met, to a great extent, by the present invention, wherein in one aspect, an apparatus is provided that in some embodiments, provides improved lubrication to bearing surfaces by allowing lubrication to remain in contact with bearing surfaces, thus, extending the life of such surfaces by minimizing frictional contact.

Consistent with one aspect of the present invention, a connecting rod is provided that in some embodiments provides a lubrication bore having an inlet configured for receiving lubrication, an outlet configured for distributing lubrication, and an inner passageway wherein the inlet and outlet are joined by the inner passageway. The outlet may include a curved sidewall shaped to create a lubrication pocket for maintaining lubrication during rotation of the outlet.

In accordance with another aspect of the present invention, a lubrication bore for a connecting rod is provided that in some embodiments provides an inlet configured for receiving lubrication and an outlet configured for distributing lubrication. The outlet may have a curved sidewall shaped to create a lubrication pocket for maintaining lubrication during rotation of the outlet. The lubrication bore may also include an inner passageway joining the inlet and outlet.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate embodiments of the invention and together with the description, serve to explain the principles of the invention.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1A is a perspective view illustrating a connecting rod consistent with an embodiment of the invention;

FIG. 1B illustrates a tool for forming a groove illustrated in FIG. 1A;

FIG. 1C is a cross-sectional view taken along line 1C-1C of FIG. 1A;

DESCRIPTION OF THE EMBODIMENTS

Figure 1D:
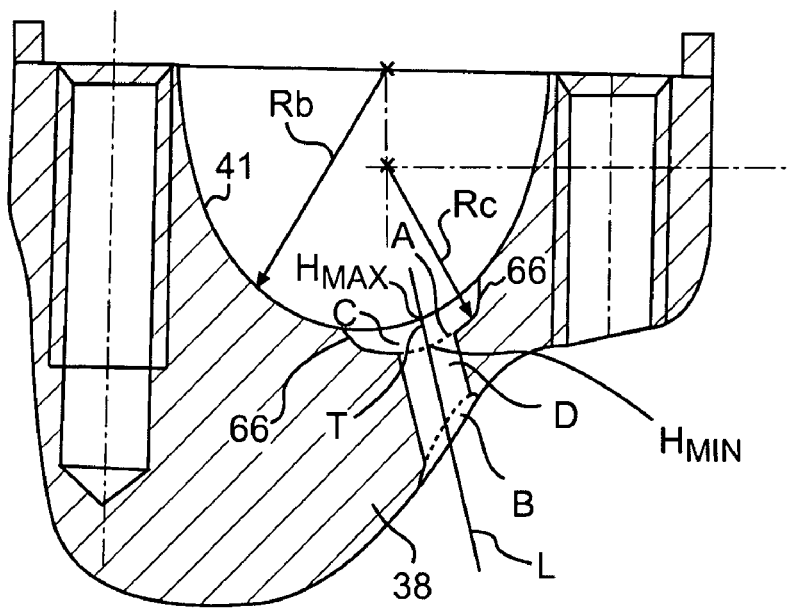
FIG. 1D is a cross-sectional view taken along line 1D-1D of FIG. 1A.

Reference will now be made in detail to the present embodiment of the invention, an example of which is illustrated in the accompanying drawings. Wherever possible, the same reference numbers will be used throughout the drawings to refer to the same or like parts.

Referring to the drawings, FIG. 1A illustrates a connecting rod 10 for an internal combustion engine (not shown). The connecting rod 10 may be utilized to connect a reciprocating piston to a rotating crankshaft. The disclosed embodiment is shown having a piston pin bearing hole 30 and a crankpin bearing hole 40. Connecting rod 10 may include an elongate body or beam 32. Retaining members 48, 50, such as threaded bolts, may be utilized to connect an arcuate shaped cap member 44 to a crankpin bearing portion 38.

Groove C may be disposed in an inner surface 41 of the crankpin bearing 46. Groove C may include a beveled edge 45 having a curvilinear design shape within the inner surface 41, such as that formed by a beveled edge key cutter 60 (FIG. 1B). Groove C may be formed by a pair of curved sidewalls 64 and a pair of curved end walls 66 extending from the inner surface 41 of the connecting rod 10 (FIG. 1C). Beveled edge 45 may be an improvement over some traditional groove designs having, for instance, angled wall edges, which may tend to trap oil and/or contaminants along these wall edges. Alternatively, the beveled edge design of groove C may prevent or greatly reduce oil and/or contamination build-up within the groove, since build-up would be less susceptible to being retained within or along the inherent curvilinear design of beveled edge 45 in groove C.

Figure 2A:
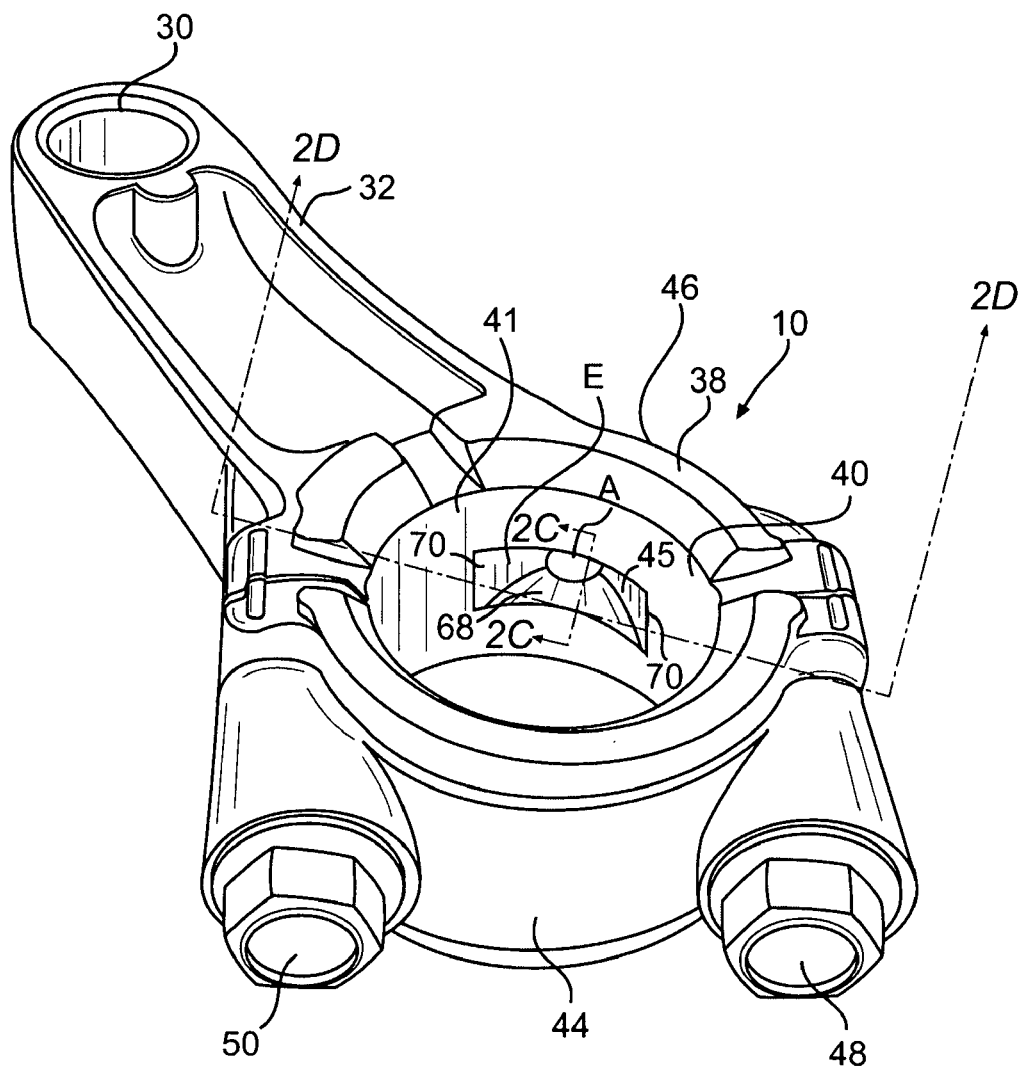
FIG. 2A is a perspective view illustrating a connecting rod consistent with another embodiment of the invention.
Figure 2B:
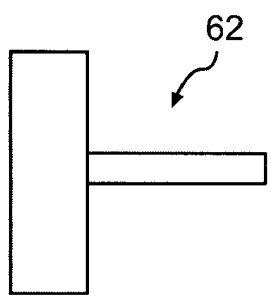
FIG. 2B illustrates a tool for forming a groove illustrated in FIG. 2A.
Figure 2C:
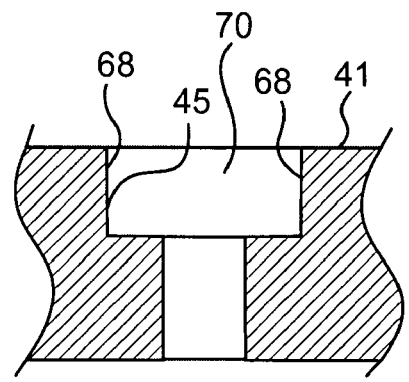
FIG. 2C is a cross-sectional view taken along line 2C-2C of FIG. 2A.

Additionally, alternative designs may be utilized to produce various groove configurations including beveled edge 45. For example, key cutter 62 (FIG. 2B) may be utilized to produce groove E as shown, for example, in FIG. 2A. Groove E may be formed by a pair of flat sidewalls 68 and a pair of curved end walls 70 extending from the inner surface 41 of the connecting rod 10 (FIG. 2C). Again, the beveled edge design of groove E may prevent or greatly reduce oil and/or contamination build-up within the groove, since build-up would be less susceptible to being retained within or along the inherent curvilinear design of beveled edge 45 in groove E.

Figure 3:
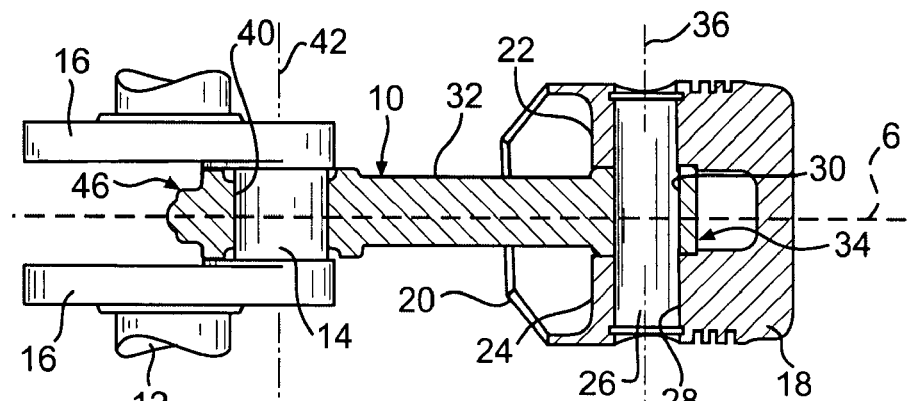
FIG. 3 illustrates a sectional view at one crank of an engine crankshaft and a piston and connecting rod in a plane containing the axes of the crankpin bearing and piston pin bearing of the connecting rod consistent with an embodiment of the invention.
Figure 4:
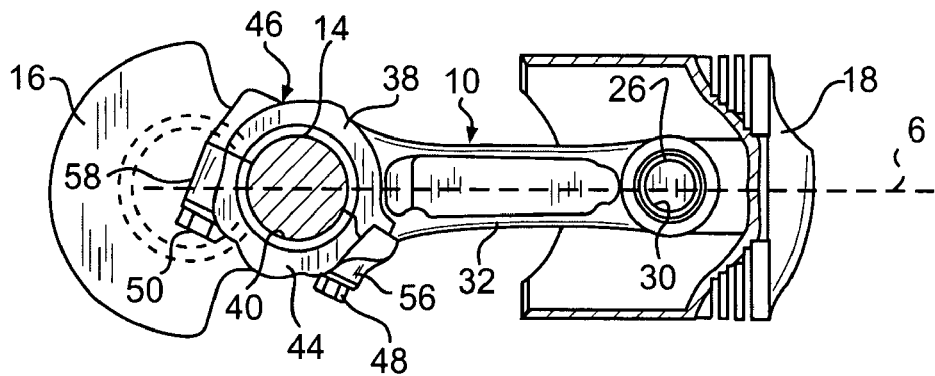
FIG. 4 is an elevational view taken normal to the bearing axes with parts of the crankshaft and piston broken away and in section consistent with an aspect of the invention.
Figure 5:
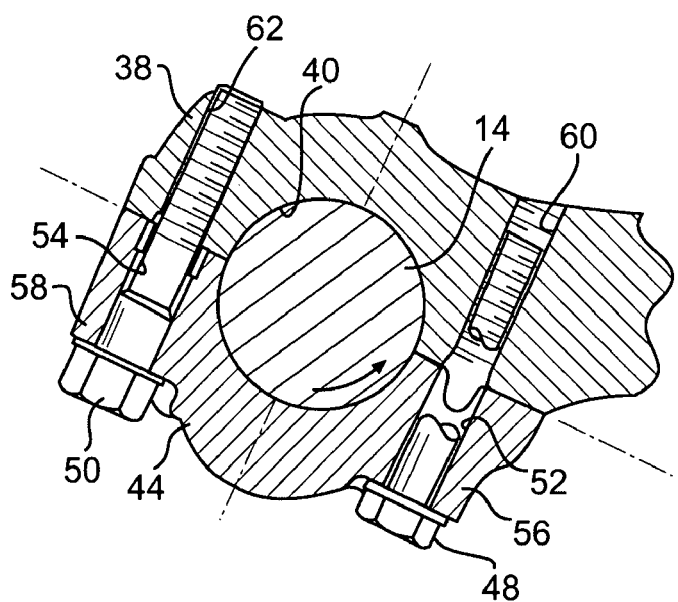
FIG. 5 is an enlarged cross-sectional view of the crankpin bearing according to an additional aspect of the invention.

Turning to FIGS. 3-5, an exemplary embodiment of a crankshaft 12 is illustrated. The crankshaft 12 may include a crankpin 14 having a surface of circular cross section disposed between and interconnecting with a pair of spaced apart cranks or cheeks 16. A piston 18 may be arranged to reciprocate in a corresponding combustion cylinder (not shown) of the engine and may be connected to crankpin 14 of crankshaft 12 by the connecting rod 10. The connecting rod 10 may transmit rectilinear thrust of the forces of combustion within the cylinder on the piston 18 to rotate the crankshaft 12 in a conventional manner. In some exemplary embodiments, the piston 18 may include a hollow skirt 20, which supports the piston 18 in the cylinder walls of the engine. The piston 18 may also include a pair of bosses 22 and 24 formed oppositely on the inside of the skirt 20 for supporting a wrist pin 26 in aligned holes 28, which are bored through the piston 18 and intersect at right angles of a reciprocating axis 6 of piston 18 (FIGS. 3 and 4). When assembled, the pin 26 extends through a piston pin bearing hole 30 formed in the upper end of the connecting rod 10, which is disposed between the bosses 22 and 24 inside the skirt 20.

In other exemplary embodiments, the connecting rod 10 may comprise a rigid elongate body or beam 32. The beam 32 may include a piston pin bearing 34 at its upper end, which defines a piston pin bearing hole 30 having a first axis 36, and an arcuate shaped crankpin bearing portion 38 at its other or lower end defining part of a crankpin bearing hole 40 and a second axis 42 parallel to axis 36. A separable arcuate shaped cap member 44 may be disposed in mating relationship with the crankpin bearing portion 38 to form a crankpin bearing 46 when assembled to crankpin bearing portion 38. In order to assemble the cap member 44 to crankpin bearing portion 38, a retaining member or any other retaining means, such as a pair of bolts or screws 48 and 50, may be utilized to pass through the bores 52 and 54, respectively. The bores 52 and 54 may be formed in corresponding bosses 56 and 58, respectively, which are, in turn, disposed on opposite sides of the cap member 44, and attached such as via a threaded engagement with the female threaded bores 60 and 62, respectively, which are formed on opposite sides of the crankpin bearing portion 38, as shown, for example, in FIG. 5. Thus, crankpin bearing 46 may be secured about crankpin 14 by turning down bolts 48 and 50.

Turning to FIG. 1D, an exemplary bore of the connecting rod 10 is illustrated. The bore may include an interior outlet A, an exterior inlet B, and an inner passageway D, which joins interior outlet A and exterior inlet B. In the exemplary embodiment of FIG. 1D, the interior outlet A may form an opening for dispensing lubrication. The exemplary embodiment illustrates an elliptical-shaped opening, more easily shown in FIG. 1A. Alternatively, an opening having another configuration, such as a rectangular-shaped opening, for dispensing lubrication may be configured within the bore. As illustrated, the interior outlet A may form a wider opening than the diameter of the inner passageway D of the bore itself. In some embodiments, the interior outlet A may be formed by a groove C. As previously discussed, groove C of the embodiment shown in FIG. 1D may be formed by a pair curved sidewalls 64 (FIGS. 1A and 1C) and a pair of curved end walls 66 extending from the inner surface 41 of the connecting rod 10.

Figure 2D:
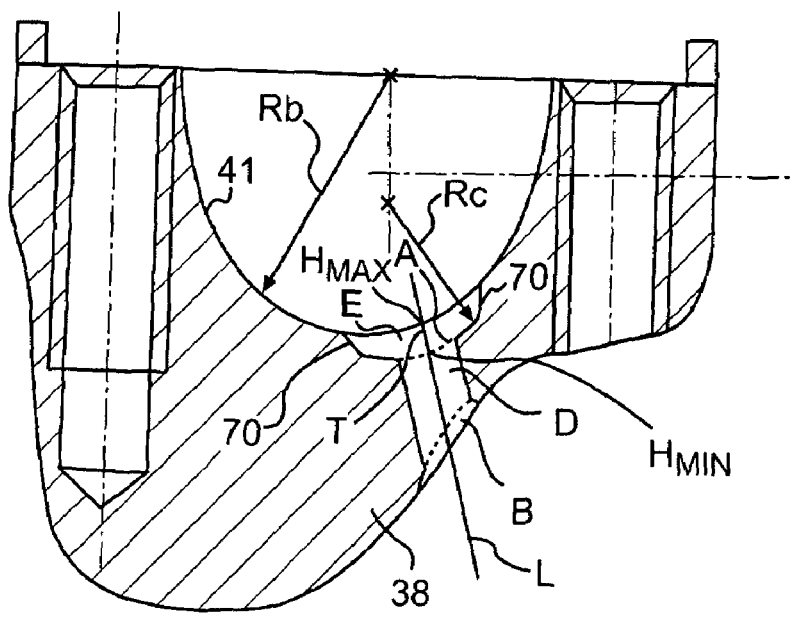
FIG. 2D is a cross-sectional view taken along line 2D-2D of FIG. 2A.

Turning to FIG. 2D, another exemplary bore of the connecting rod 10 is illustrated. Likewise, the bore may include an interior outlet A, an exterior inlet B, and an inner passageway D, which joins interior outlet A and exterior inlet B. In the exemplary embodiment of FIG. 2D, the interior outlet A may form an opening for dispensing lubrication. Again, the exemplary embodiment illustrates an elliptical-shaped opening, more easily shown in FIG. 2A. As in the aforementioned embodiment, an opening having an alternate configuration, such as a rectangular-shaped opening, for dispensing lubrication may be configured within the bore. As illustrated, the interior outlet A may form a wider opening than the diameter of the inner passageway D of the bore itself. In some embodiments, the interior outlet A may be formed by a groove E. As previously discussed, groove E of the embodiment shown in FIG. 2D may be formed by a pair of flat sidewalls 68 (FIGS. 2A and 2C) and a pair of curved end walls 70 extending from the inner surface 41 of the connecting rod 10.

The groove C formed by the pair of curved sidewalls 64 and curved end walls 66 may have a radius of curvature $R_C$ that is less than a radius of curvature $R_b$ of the inner surface of crankpin bearing hole 40 in the connecting rod 10. Likewise, the groove E formed by the pair of flat sidewalls 68 and curved end walls 70 may have a radius of curvature $R_C$ that is less than a radius of curvature $R_b$ of the inner surface of crankpin bearing hole 40 in the connecting rod 10. The center of the radius of curvature $R_C$ may intersect a longitudinal axis L that extends through the center of the interior outlet A, the exterior inlet B, and the inner passageway D. In some preferred embodiments, the radius of curvature $R_C$ may range from about 7.83 mm to about 9.75 mm. The radius of curvature $R_C$ may be adjusted based on the radius of curvature $R_b$ of the crankpin bearing hole 40, for example, to accommodate different sizes of the connecting rod 10. For instance, when the radius of curvature $R_b$ of the crankpin bearing hole 40 is 30 mm, the radius of curvature $R_C$ of groove C (formed by the pair of curved sidewalls 64 and curved end walls 66) or groove E (formed by the pair of flat sidewalls 68 and curved end walls 70) may be approximately 7.83 mm. Alternatively, when the radius of curvature $R_b$ of the crankpin bearing hole 40 is 36 mm, the radius of curvature $R_C$ of groove C (formed by the pair of curved sidewalls 64 and curved end walls 66) or groove E (formed by the pair of flat sidewalls 68 and curved end walls 70) may be approximately 9.75 mm.

As also illustrated in FIG. 1D, the pair of curved sidewalls 64 may include a minimum height $H_{min}$ and a maximum height $H_{max}$ intersecting a point as measured along longitudinal axis L. Similarly, as illustrated in FIG. 2D, the pair of flat sidewalls 68 may include a minimum height $H_{min}$ and a maximum height $H_{max}$ intersecting a point as measured along longitudinal axis L. A distance T defined, for example, between the minimum height $H_{min}$ and maximum height $H_{max}$ along longitudinal axis L may be approximately 1.92 mm. In some embodiments, distance T may remain constant, that is, independent of the radius of curvature of $R_C$. For example, T may be approximately 1.92 mm, as the radius of curvature $R_C$ is adjusted with respect to the radius of curvature $R_b$ of the crankpin bearing hole 40 to accommodate, for example, various sizes of the crankpin bearing hole 40.

In the exemplary embodiments illustrated in FIGS. 1D and 2D, the groove C and the groove E, respectively, may be oriented to extend along a direction parallel to the inner surface 41 of the connecting rod 10. Both groove C and groove E, however, may be oriented in any other manner so long as it provides a wider opening than an inner passageway D of the bore itself. For instance, both groove C and groove E may be oriented to extend along a direction perpendicular to the inner surface 41 of the connecting rod 10. Moreover, although a single groove C and groove E are illustrated in FIG. 1D and FIG. 2D, respectively, any number of grooves may be used.

During rotation of the connecting rod 10, groove C or groove E may create a pocket for allowing lubrication to remain in contact with the outer surface of the crankpin 14 and the inner surface 41 of crankpin bearing 46. This design may extend the life of crankpin bearing 46 by preventing lubrication from escaping from the pocket and, thereby, minimizing frictional contact between the crankpin 14 and the crankpin bearing 46 during operation.

Figure 1E:
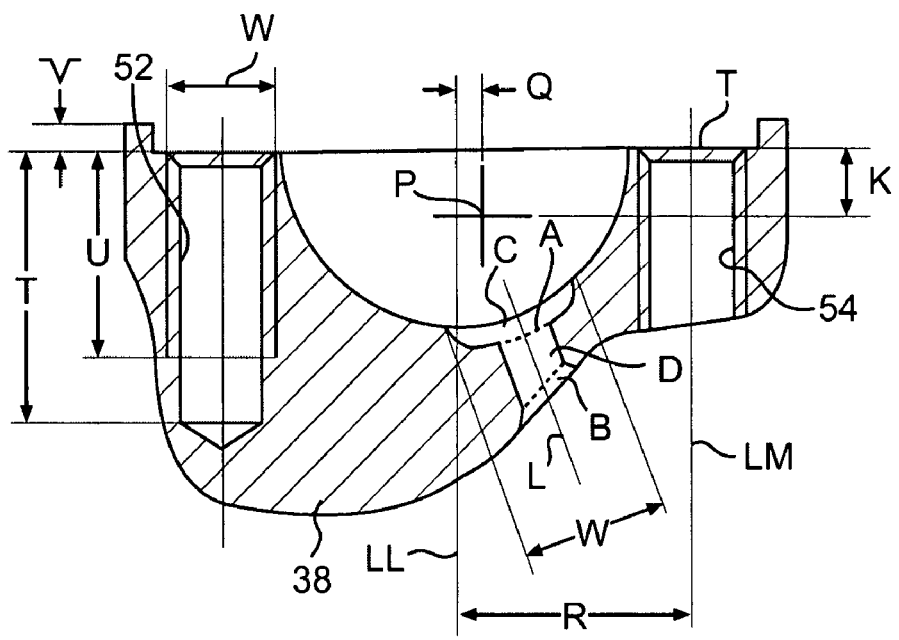
FIG. 1E is a cross-sectional view of the bearing portion of the connecting rod consistent with a further aspect of the invention.

Turning to FIG. 1E, an exemplary embodiment is shown depicting a cross-sectional view of the crankpin bearing portion 38 of the connecting rod 10. The bore, in this embodiment, may include an interior outlet A and an exterior inlet B. The interior outlet A may be provided with a wider opening than the inner passageway D of the bore itself. In one embodiment, a width W of the interior outlet A may be about 11.22 mm. Longitudinal line L may intersect at a cross-hair point P located at a distance K, for example, at about 4.86 mm, below a top line surface of the crankpin bearing portion 38.

As depicted in FIG. 1E, a longitudinal line LL may be defined through a center point of the crankpin bearing hole 40 located at a distance R, for example, about 17.49 mm, from a longitudinal line LM running along a midpoint of the bored channel 54. In some embodiments, the cross-hair point P may be juxtaposed at a distance Q, for example, about 1.77 mm, from the longitudinal line LL running through the center point of the crankpin bearing hole 40.

As also illustrated in FIG. 1E, the bored channels 52, 54 may be formed by machined holes. In one embodiment, the machined hole of bored channel 52 may extend a distance T, for example, approximately 20 mm into a surface of the crankpin bearing portion 38. A threaded portion, such as one having a length U, may extend approximately 15 mm into a surface of the crankpin bearing portion 38. The machined hole may include, for instance, the threaded portion of the machined hole, which may extend a distance V, for example, about 2 mm below a surface of the crankpin bearing portion 38.

Figure 2E:
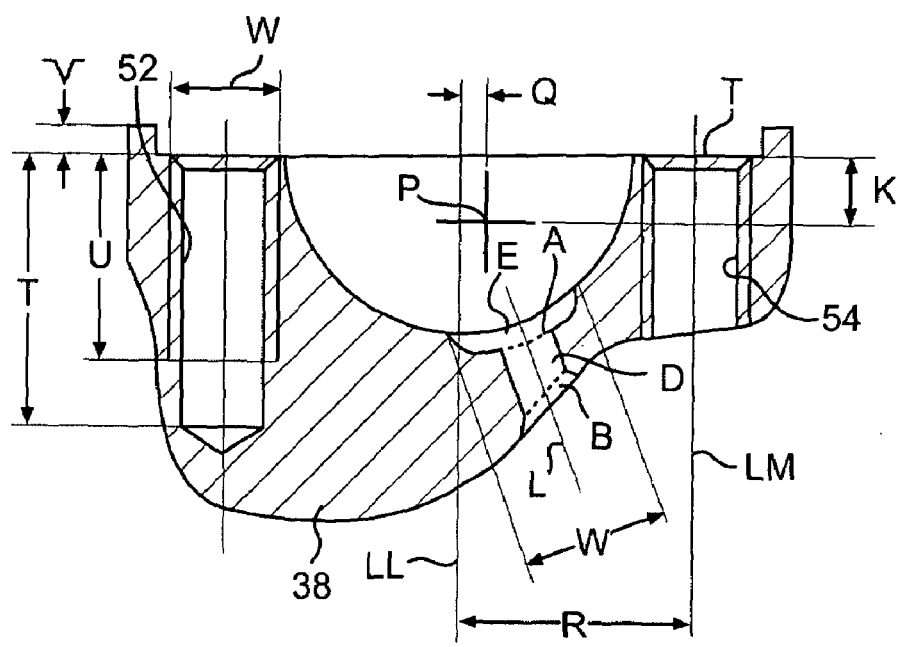
FIG. 2E is a cross-sectional view of the bearing portion of the connecting rod consistent with a further aspect of the invention.

A similar configuration is shown, for example, in FIG. 2E illustrating a similar configuration with respect to groove E.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A lubrication system comprising:
   a crankpin having an outer surface;
   a connecting rod having an inner surface slidably disposed relative to the outer surface of the crankpin, the inner surface having a first radius of curvature;
   a bore extending through the connecting rod, and having an inner passageway and an outlet configured to dispense lubrication onto the outer surface of the crankpin; and
   wherein the outlet of the bore includes a pair of sidewalls and a pair of end walls, each of the pair of end walls including a curved surface having a continuous curvature extending from the inner passageway of the bore to the inner surface and having a second radius of curvature that is less than the first radius of curvature of the inner surface of the connecting rod, and wherein an entirety of the outlet of the bore is directly exposed to the crankpin.

2. The lubrication system of claim 1, wherein the curved surface of the outlet of the bore is shaped to create a curved lubrication pocket.

3. The lubrication system of claim 2, wherein the curved lubrication pocket has a width that is greater than a diameter of the inner passageway of the bore.

4. The lubrication system of claim 1, wherein the inner passageway extends away from the outlet, and the curved surface of the outlet has a width that is wider than the inner passageway.

5. The lubrication system of claim 1, wherein the second radius of curvature is between about 7.83 mm and about 9.75 mm.

6. The lubrication system of claim 5, wherein the second radius of curvature is adjusted based upon a size of the connecting rod.

7. The lubrication system of claim 1, wherein when the first radius of curvature is about 30 mm, the second radius of curvature is about 7.83 mm, and when the first radius of curvature is about 36 mm, the second radius of curvature is about 9.75 mm.

8. The lubrication system of claim 6, wherein the curved surface includes a distance defined between a maximum height and a minimum height of the sidewalls, and wherein the distance is independent of the first radius of curvature.

9. The lubrication system of claim 8, wherein the distance about 1.92 mm.

10. A lubrication system comprising:
a crankpin having an outer surface; and
a connecting rod having an inner surface movably disposed relative to the outer surface of the crankpin, an inlet configured to receive lubrication, an outlet configured to dispense lubrication, and a passageway extending between the inlet and the outlet; and
wherein the outlet of the connecting rod includes a pair of sidewalls and a pair of end walls, each of the pair of end walls including a curved surface having a continuous curvature extending from the passageway to the inner surface, and wherein an entirety of the outlet is directly exposed to the crankpin.

11. The lubrication system of claim 10, wherein the curved surface includes a curved pocket of lubrication having a width that is greater than the width of the passageway.

12. The lubrication system of claim 11, wherein the inner surface of the connecting rod is curved and has a first radius of curvature, and the curved surface of the outlet has a second radius of curvature that is less than the first radius of curvature of the inner surface of the connecting rod.

13. The lubrication system of claim 12, wherein the second radius of curvature is between about 7.83 mm and about 9.75 mm.

14. A lubrication system comprising:
a crankpin having an outer surface; and
a connecting rod having a curved inner surface movably disposed relative to the outer surface of the crankpin, an inlet configured to receive lubrication, an outlet configured to dispense lubrication, and an inner passageway extending between the inlet and the outlet; and
wherein the outlet of the connecting rod includes a pair of sidewalls and a pair of end walls, each of the pair of end walls including a curved surface having a continuous curvature extending between the curved inner surface and the inner passageway of the connecting rod, the curved surface having a radius of curvature that is less than a radius of curvature of the curved inner surface of the connecting rod and a curved pocket of lubrication having a width that is greater than the width of the inner passageway of the connecting rod, and wherein an entirety of the outlet is directly exposed to the crankpin.

* * * * *